United States Patent [19]
Yoshida

[11] Patent Number: 5,357,376
[45] Date of Patent: Oct. 18, 1994

[54] VANITY MIRROR

[75] Inventor: Yoshihide Yoshida, Shimizu, Japan

[73] Assignee: Koito Manufacturing Co., Ltd., Tokyo, Japan

[21] Appl. No.: 5,233

[22] Filed: Jan. 15, 1993

[30] Foreign Application Priority Data

Feb. 17, 1992 [JP] Japan .................. 4-061509

[51] Int. Cl.⁵ .................. B60J 3/00
[52] U.S. Cl. .................. 359/844; 359/871; 296/97.5; 362/135; 362/144; 220/335
[58] Field of Search .................. 359/871, 872, 844; 362/135, 140, 141, 142, 144; 296/97.5; 220/335, 315

[56] References Cited

U.S. PATENT DOCUMENTS

| 3,432,967 | 3/1969 | Simon | 220/335 |
| 4,227,241 | 10/1980 | Marcus | 362/135 |
| 4,981,348 | 1/1991 | Prillard | 359/844 |
| 5,022,699 | 6/1991 | Yoshida | 362/144 |
| 5,059,016 | 10/1991 | Lawassani et al. | 296/97.5 |
| 5,117,337 | 5/1992 | Sakuma | 296/97.5 |

FOREIGN PATENT DOCUMENTS 231238  9/1990  Japan .................. 296/97.5

Primary Examiner—Edward K. Look
Assistant Examiner—James A. Larson
Attorney, Agent, or Firm—Koda and Androlia

[57] ABSTRACT

A vanity mirror with a pivotally mounted front cover that can be kept opened and closed via a coil spring force. A coil spring and a sliding piece are installed in the main casing of the vanity mirror, and the coil spring presses the sliding piece against a mounting lug of the front cover, thus the pivot-opened front cover is kept opened by the coil spring and the pivot-closed front cover is kept closed by the coil spring.

6 Claims, 9 Drawing Sheets

June 2, 3, 37, 3, 70

VANITY MIRROR

BACKGROUND OF THE INVENTION

1. Field of the Invention

The present invention relates to a vanity mirror and more particularly to a vanity mirror with a cover that opens and closes in front of the mirror.

2. Prior Art

One example of a vanity mirror that has a front cover retaining structure for keeping the front cover in the opened and closed positions is disclosed in Japanese Patent Application Laid-Open ("Kokai") No. 2-102840. This Japanese application corresponds to the U.S. Pat. No. 5,022,699 owned by the assignee of the present application.

In this cover retaining structure, the front cover is pivotally mounted to a rear cover of the vanity mirror via mounting lugs formed on the front cover. Each one of the mounting lugs has two end surfaces: one faces the back of the vanity mirror when the front cover is opened, and the other faces the back when the front cover is closed. In addition, spring members are provided in the rear cover so that the springs are elastically kept in contact with the end surfaces of the mounting lugs to keep the front cover in the opened and closed positions.

FIG. 9 shows the details of such a vanity mirror cover retaining structure.

The vanity mirror a essentially includes a rear cover b and a front cover c that opens and closes in front of the mirror of the vanity mirror a.

The front cover c is provided with a mounting lug d that is pivotally connected to the rear cover b. The mounting lug d has a first end surface e that faces the back (left-ward in FIG. 9) when the front cover c is opened and a second end surface f that faces the back when the front cover c is closed.

The rear cover b has an empty space g in the upper part that accommodates the rear portion of the mounting lug d and is opened upwardly.

A spring member h made of an elastic material and bent and formed into a V-shape is installed in the empty space g. The spring h has a front piece j and a rear piece i and is set up-side-down so that the central bent portion is near the top of the empty space g. The front piece j of the spring member h is positioned so that it contacts the first and second end surfaces of the mounting lug d, and the rear piece i is placed on the inner surface of the bottom board of the rear cover b.

When the front cover c is opened, it is kept open by the front piece j of the spring member h that presses the first end surface e of the mounting lug d to the front (right-ward in FIG. 9). When the front cover c is closed, it is kept closed by the front piece j of the spring member h that presses the second surface f of the mounting lug d.

As seen from the above, in the conventional vanity mirror, the V-shaped spring member h is the element that presses the mounting lug d of the front cover c so as to keep the front cover in the opened and closed positions. In view of this function of the spring member, the spring member h must have a spring force that is sufficient to keep the front cover c in the opened and closed positions, and the spring member must also be durable. As a result, the spring member h cannot be small. In addition, the gap between the front and rear pieces i and j of the spring member h needs to be large to some extent to secure an appropriate spring force. This causes the vanity mirror to be thick. It is also necessary that a point on the front piece j, that is in contact with and presses against the first and second end surfaces e and f of the mounting lug d, must be some distance away from the central bent portion of the spring member.

In view of the above, the empty space g that houses the spring member h cannot be small in a thick-wise direction (right and left directions in FIG. 9). In addition, since the top portion of the spring member h can protrude upward above the upper edge line of the front cover c, the vanity mirror cannot be thin or compact.

SUMMARY OF THE INVENTION

Accordingly, the object of the present invention is to provide a new type of front cover retaining structure for a vanity mirror so that the thickness required for accommodating a mechanism that keeps the front cover in the opened and closed positions can be small, and there is no need to use structural members that would protrude above or below the front cover, thus making the vanity mirror thin and compact.

In order to accomplish the object, the present invention has a unique cover retaining structure for a vanity mirror that essentially uses coil springs (and not V-shaped springs) and sliding pieces which are installed in spaces formed in a rear cover or a base casing of the vanity mirror.

More specifically, the cover retaining structure for a vanity mirror of the present invention comprises:

- a base casing having elongated spaces along the both ends;
- a front cover pivotally mounted to the base casing via mounting lugs formed at both ends, each one of the mounting lugs having a round end that has first and second pressing points;
- a sliding piece installed in each one of the elongated spaces of the base casing; and
- a coil spring installed in each one of the elongated spaces with one end of the coil spring attached to the sliding piece, the sliding piece being pressed against the first and second pressing points of the mounting lug by the coil spring so that the first pressing point is pressed against the sliding piece when the front cover is closed and the second pressing point is pressed against the sliding piece when the front cover is opened.

With the structure above, when the front cover is closed, the coil springs press the sliding pieces against the first pressing points of the mounting lugs so that the front cover is kept closed. When the front cover is opened, the coil springs press the sliding pieces against the second pressing points of the mounting lugs so that the front cover is kept opened.

Thus, in the vanity mirror of the present invention, a coil spring and a sliding piece is used as a means that keeps the front cover opened and closed, and this means is installed so that it can extend and be movable in the direction of the depth of the vanity mirror and not in the direction of the thickness thereof. Therefore, the vanity mirror can be thin. In addition, since one end of each one of the sliding pieces is pressed against the mounting lug of the front cover, such an end of the sliding piece does not protrude above or below the front cover, which makes the thickness of the vanity mirror small. At the same time, the fact that the sliding piece does not protrude above or below the front cover also makes the vanity mirror compact as a whole.

DETAILED DESCRIPTION OF THE INVENTION

Figure 1:
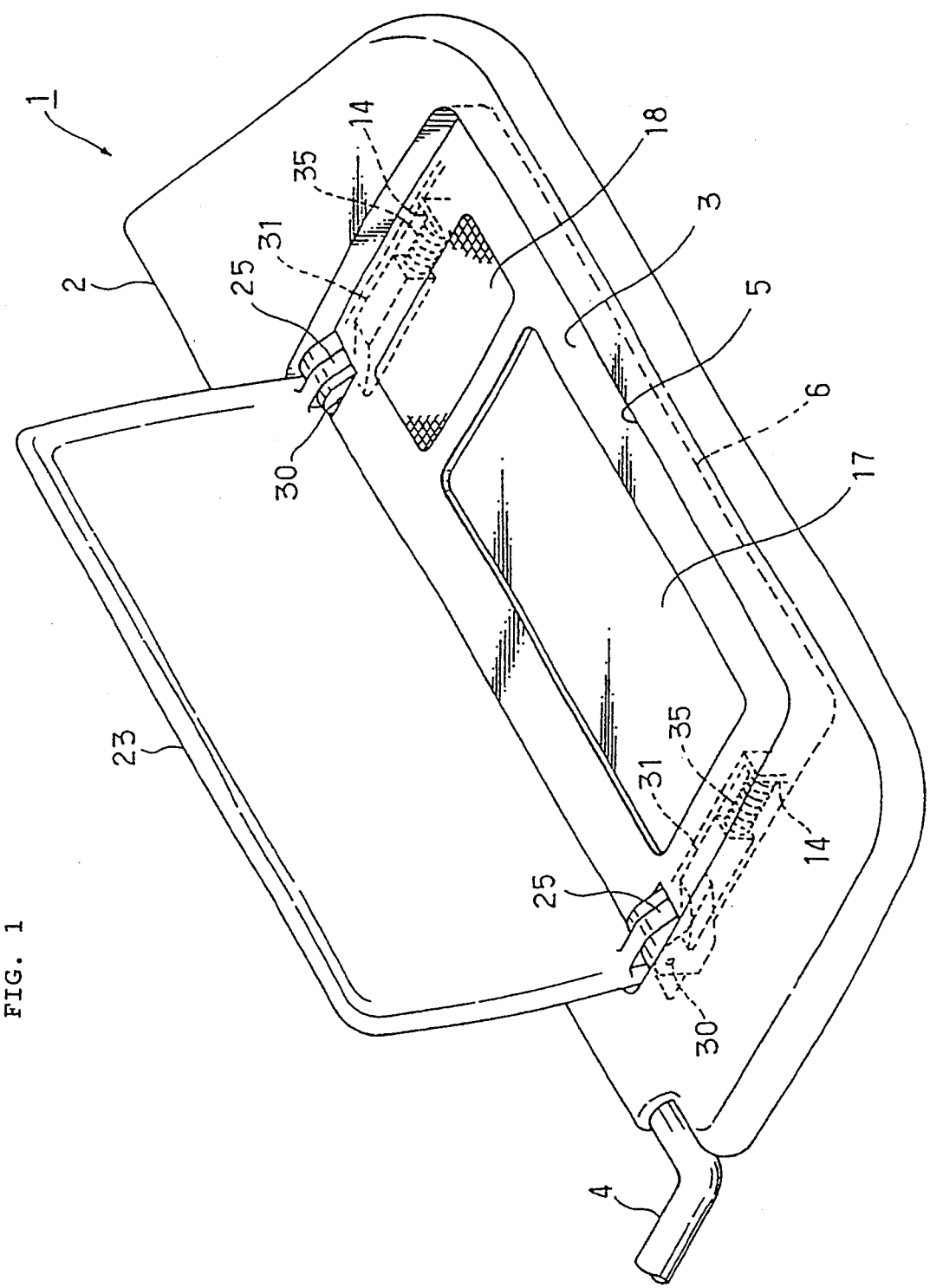
FIG. 1 shows one embodiment of the vanity mirror of the present invention mounted to a sun visor.

The vanity mirror of the present invention will be described in detail below with reference to the embodiment shown in the accompanying drawings.

In the drawings, numeral 1 refers to a sun visor assembly that includes a sun visor 2 and a vanity mirror 3 installed in the sun visor 2.

The sun visor 2 may be of any known structure. It can have a core covered with a cushioning material and a fabric cover thereon. The sun visor 2 has an attachment axle on its upper edge so that it is pivotally mounted above the windshield of a car via the attachment axle.

The sun visor 2 has a rectangular depression 5 on the front, and the vanity mirror 3 is fitted in this depression 5.

Figure 4:
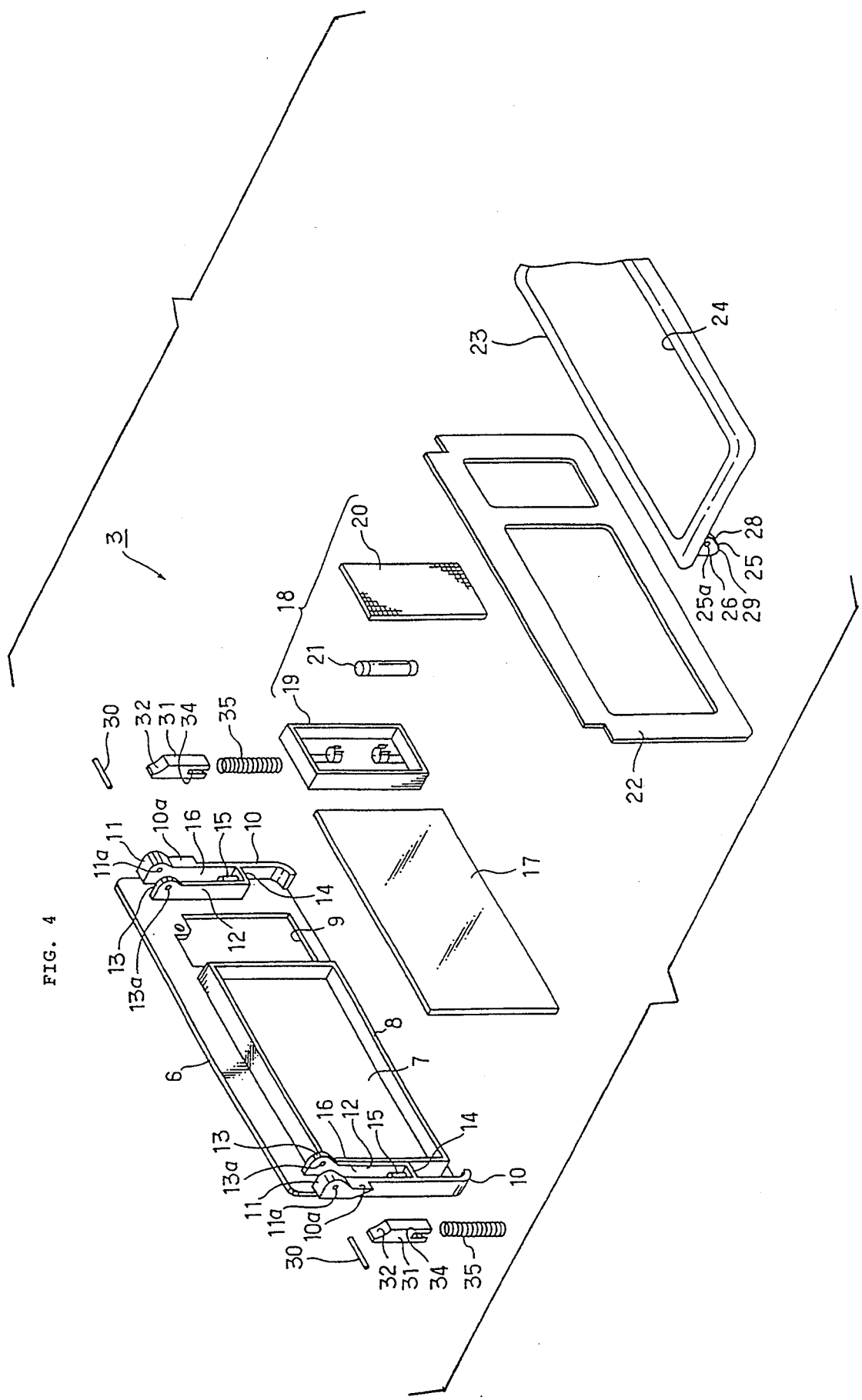
FIG. 4 is a disassembled illustration of the vanity mirror of the present invention.

As seen from FIG. 4, the vanity mirror 3 essentially comprises a base casing 6, a mirror 17 fitted in the base casing 6, a front frame 22, a front cover 23 that opens and closes in front of the mirror 17, and a lamp assembly 18.

The base casing 6 is made of a synthetic resin and has a rectangular shape having longer sides on its top and bottom (in the drawing).

A large, wide rectangular pedestal 7 is formed on the base casing 6. The pedestal 7 has a surrounding wall 8 that protrudes forward.

The base casing 6 has an attachment cut-out 9 on one side (right-hand side in the drawing) of the pedestal 7. In this attachment cut-out 9, the lamp assembly 18 which will be described later is installed.

A pair of side walls 10 are formed on both ends (right and left ends in the drawing) of the base casing 6. The side walls 10 extend from the top to the bottom (in the drawing) of the base casing 6 except for the very upper portions. The side walls 10 are slightly higher than the surrounding wall 8 of the pedestal 7, and each one of the side walls 10 has a thick portion 10a near the upper end.

Figure 6:
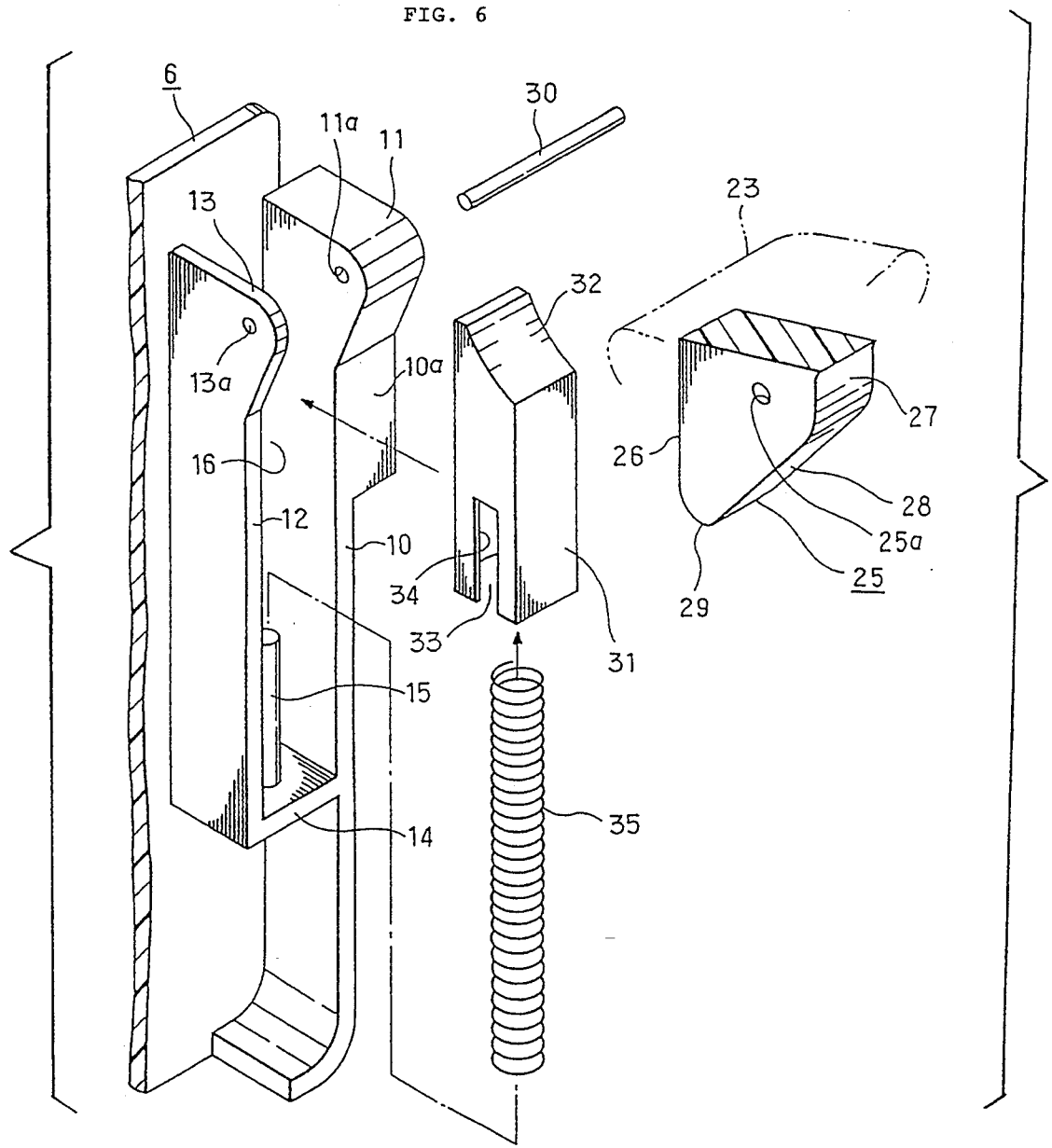
FIG. 6 is an exploded illustration thereof.

The thick portion 10a has a first cover mount 11 at the upper end. As best seen in FIG. 6, the first cover mount 11 protrudes forward and slightly upward and is provided with a first through hole 11a that extends right and left (in the drawing).

The base case 6, as seen in FIG. 4, is further provided with a pair of guide walls 12 which are approximately as high as the side walls 10. The guide walls 12 are parallel with and on the inner side of the side walls 10. Each one of the guide walls 12 faces about 2/3 of the upper portion of each side wall 10.

Like the side walls 10, each guide wall 12 is provided with a cover mount ("second cover mount") 13 that protrudes forward and slightly upward. The second cover mount 13 is essentially the same shape as the first cover mount 11 and also has a through hole ("second through hole") 13a that extends right and left in the drawings. The second through hole 13a positionally corresponds to the first through hole 11a of the side wall 10.

Between the middle point of each side wall 10 and the lower end of each guide wall 12, a spring holder 14 is formed. The spring holder 14 has a rod-like holding pin 15 at the center which is for retaining a coil spring that will be described later.

With these side walls 10, guide walls 12 and spring holder 14, a pair of rectangular spaces 16 are formed on both ends of the base casing 6. The rectangular spaces 16 are open at the top and front as shown in FIG. 4.

The mirror 17 is of a wide rectangular shape and glued to the pedestal 7 that is surrounded by the surrounding wall 8.

The lamp assembly 18 is made up by a lamp receptacle 19 of a shallow box shape, a lens 20 that covers the front of the lamp receptacle 19, and an electric bulb 21 set in the lamp receptacle 19.

The lamp assembly 18 is placed in the attachment cutout 9 of the base casing 6 and secured thereto.

The front frame 22 has windows for the mirror 17 and the lamp assembly 18 and is mounted to the base casing 6. With this front frame 22, the spaces 16 are covered on its front side so that sliding pieces and coil springs described later are housed in the spaces 16.

The front cover 23 is made of synthetic resin and is of a size that can cover the entire front side of the base casing 6.

The front cover 23 is provided with a slit-like groove 24 along its entire peripheral. The space defined by the groove 24 is glued with a fabric that is similar to that which covers the sun visor 2. The fabric is attached to the front cover 23 such that the outer edges are tucked into the slit-like groove 24.

Figure 3:
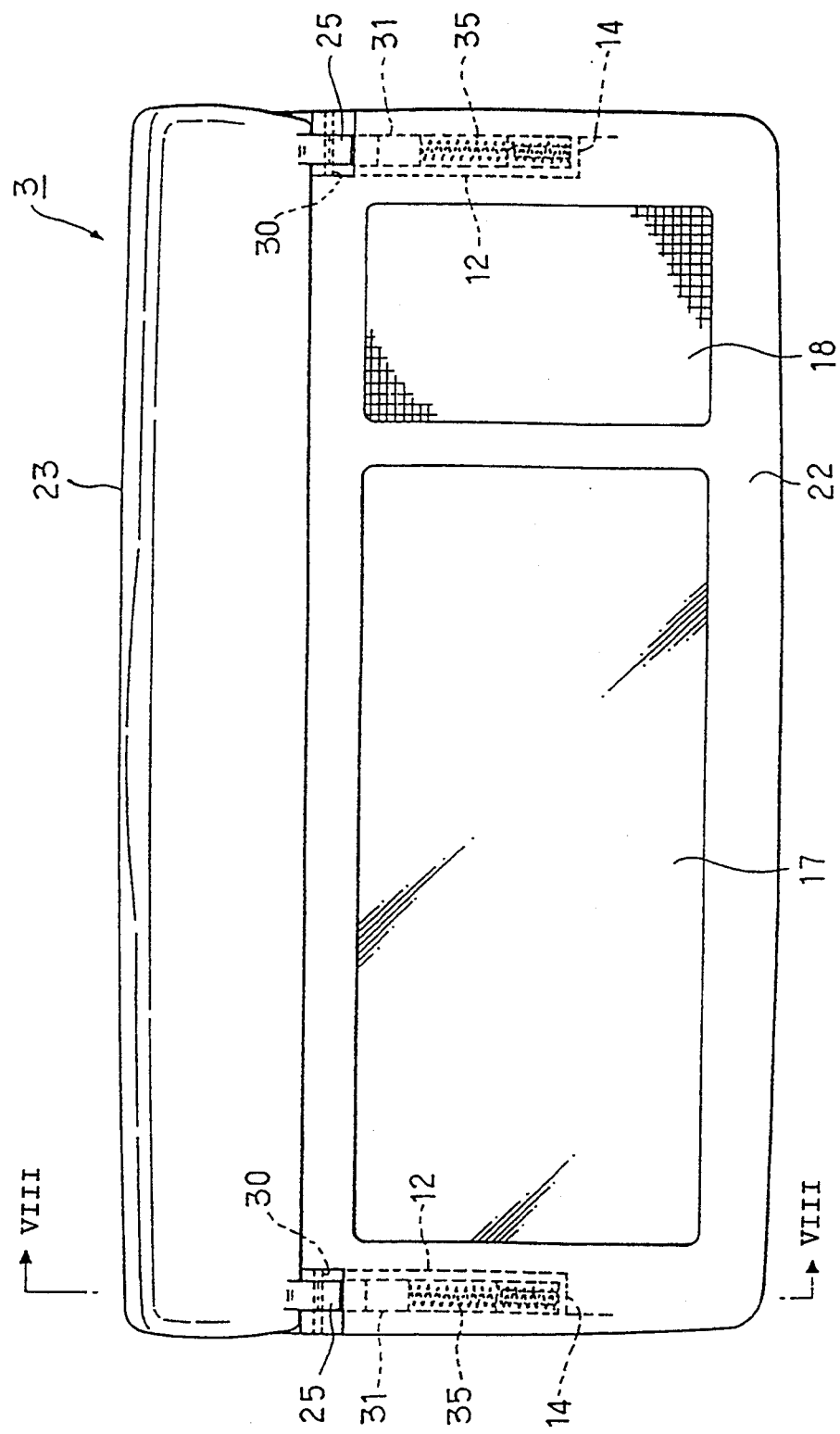
FIG. 3 is a front view thereof with the front cover opened.
Figure 7:
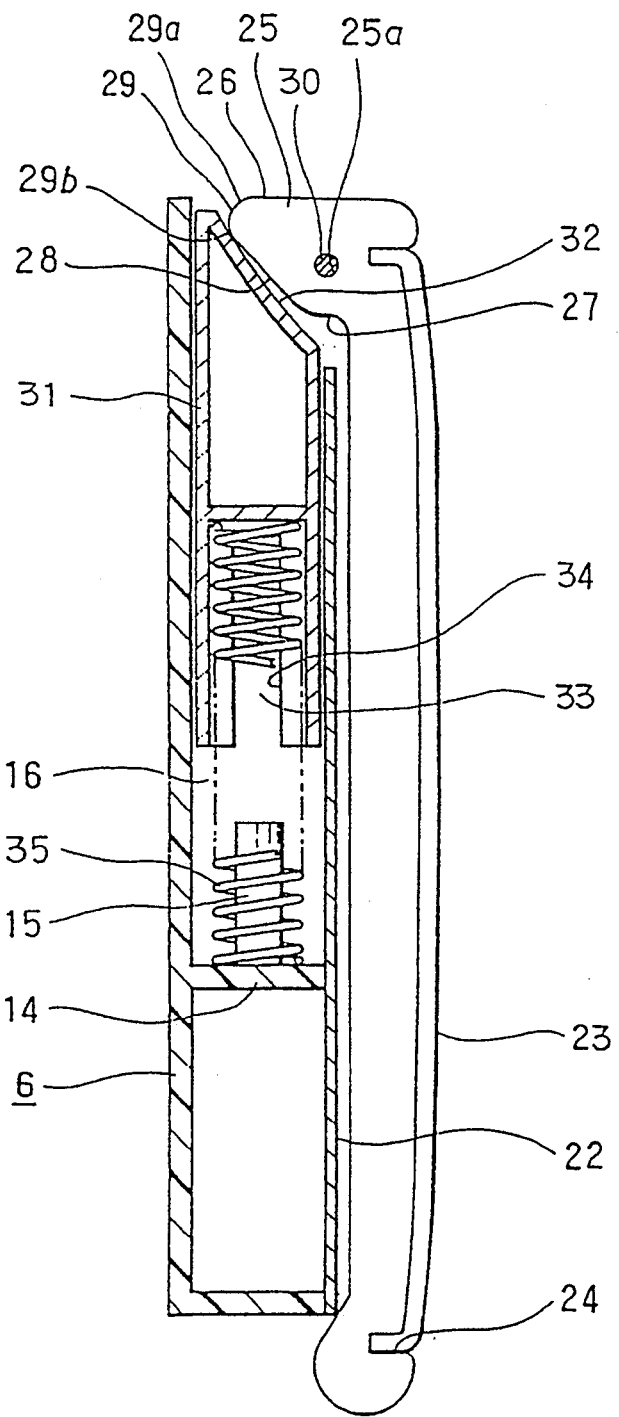
FIG. 7 is an enlarged sectional view taken along the VII—VII in FIG. 2.

As seen in FIGS. 1 and 3, a pair of mounting lugs 25 are formed at both ends and near the upper edge of the front cover 23. The mounting lugs 25 protrude backwards as best shown in FIG. 7. Each mounting lug 25 as seen in FIG. 6 has a through hole 25a opened relatively close to the root portion of the mounting lug 25.

As best seen in FIG. 6, each mounting lug 25 has a width that can fit the mounting lug 25 between the side wall 10 and the guide wall 12. The mounting lug 25 (of a somewhat triangular shape) has a continuous spherical surface on its circumference that comprises a straight end surface 26, a round surface 29 that includes a first pressing point (or opening point) 29a and a second pressing point (or closing point) 29b as shown in FIG. 7, a slanted surface 28 and a curved end surface 27.

Figure 5:
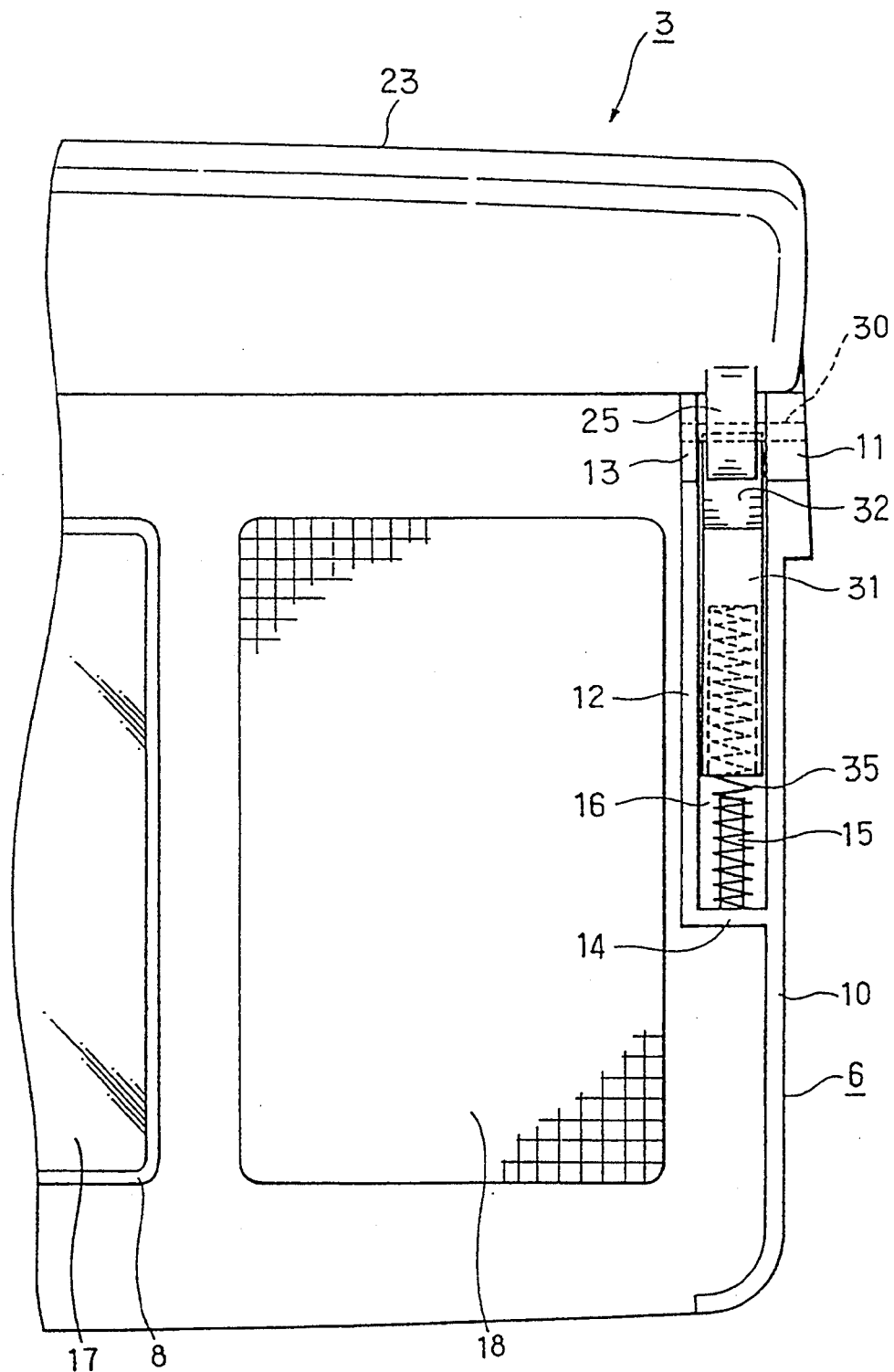
FIG. 5 is an enlarged front view of the essential part of the vanity mirror of the present invention.

As seen in FIG. 5, each mounting lug 25 is brought into the space between the first cover mount 11 of the side wall 10 and the second cover mount 13 of the guide wall 12. Then, the through hole 25a of the mounting lug 25 is aligned with the through holes 11a and 13a of the side and guide walls 10 and 12, and a pin 30 is inserted into these through holes 11a, 13a and 25a, thus installing the front cover 23 to the base casing 6. The pin 30 is in tight contact with the inner surfaces of the through holes 11a and 13a and in loose contact with the inner surface of the through hole 25a. As a result, the front cover 23 is pivotal about the pin 30 relative to the base casing 6 via the mounting lugs 25.

Figure 2:
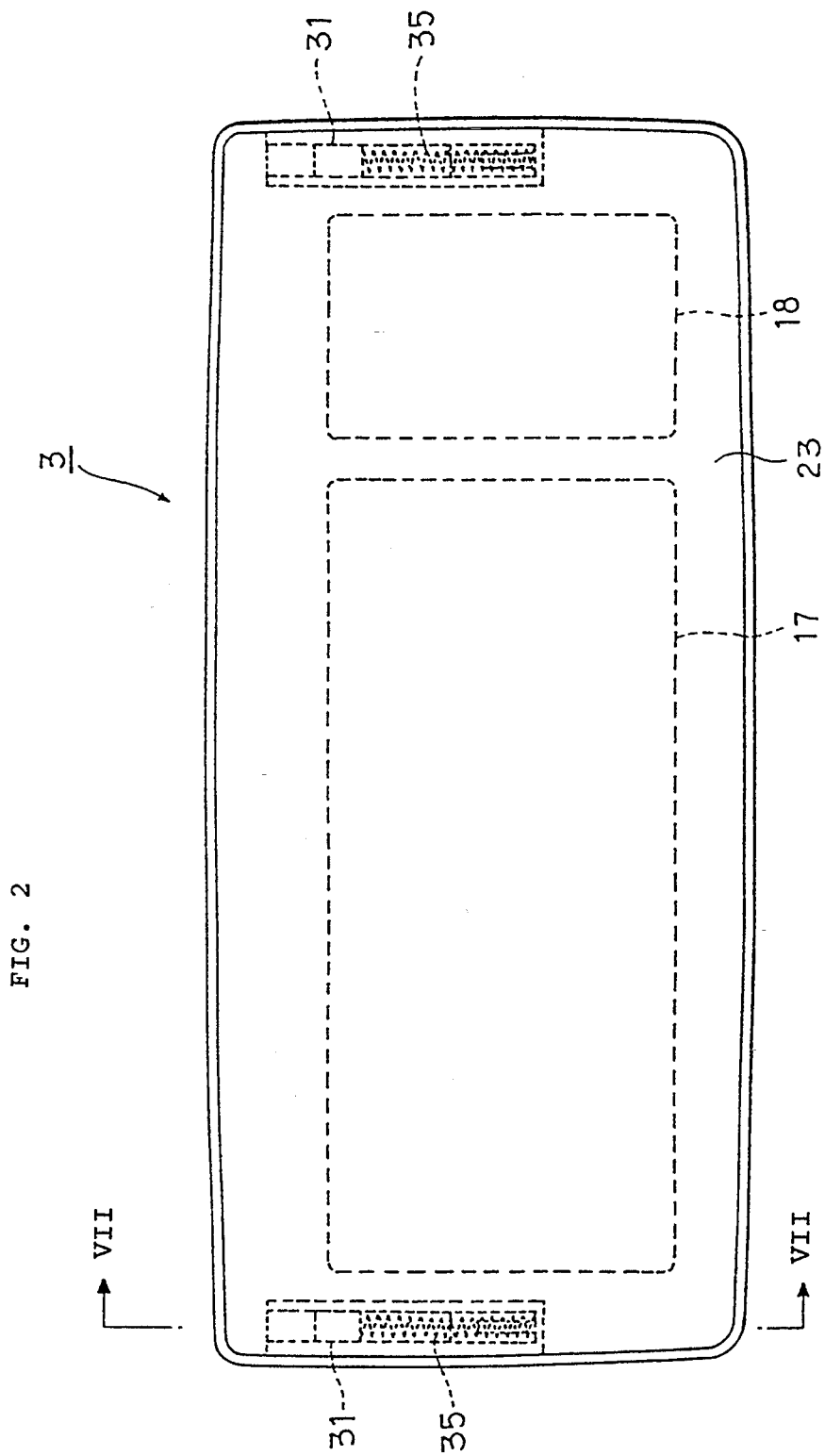
FIG. 2 is a front view of the vanity mirror with the front cover closed.
Figure 8:
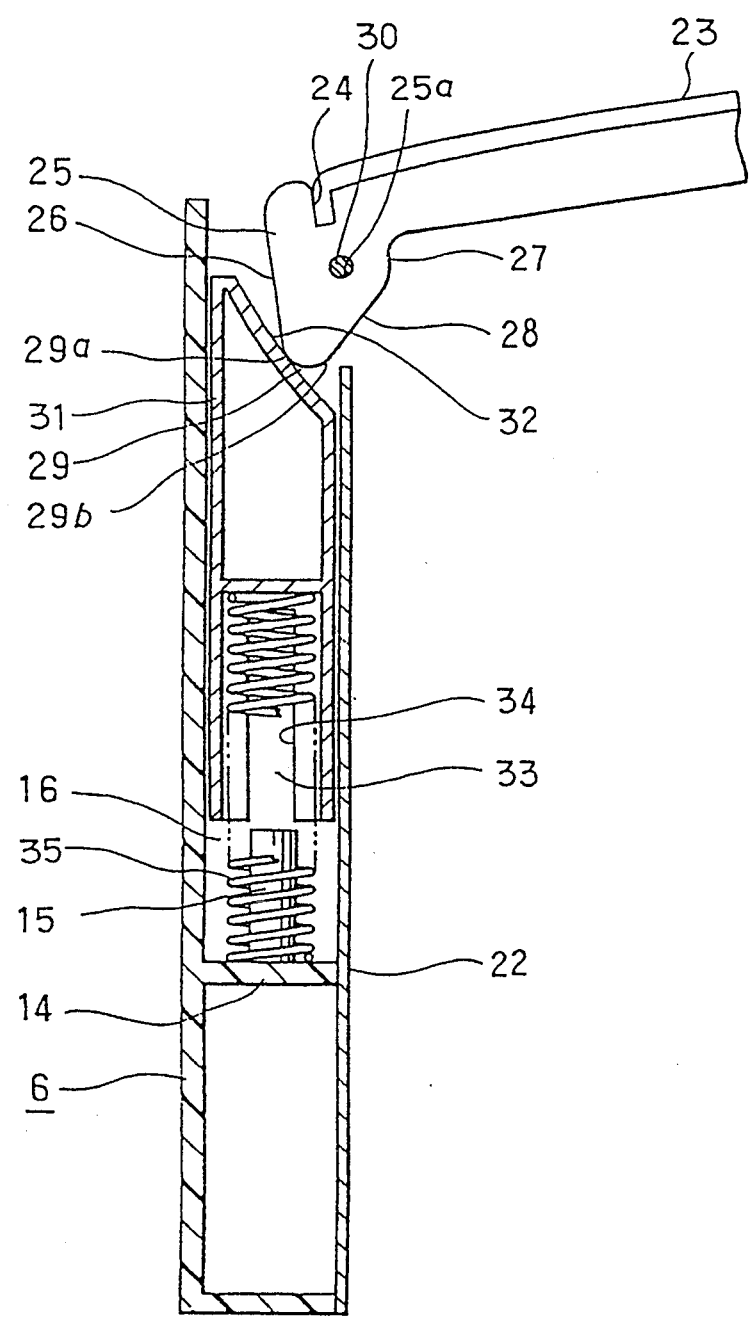
FIG. 8 is an enlarged sectional view taken along the VIII—VIII in FIG. 3.
Figure 9:
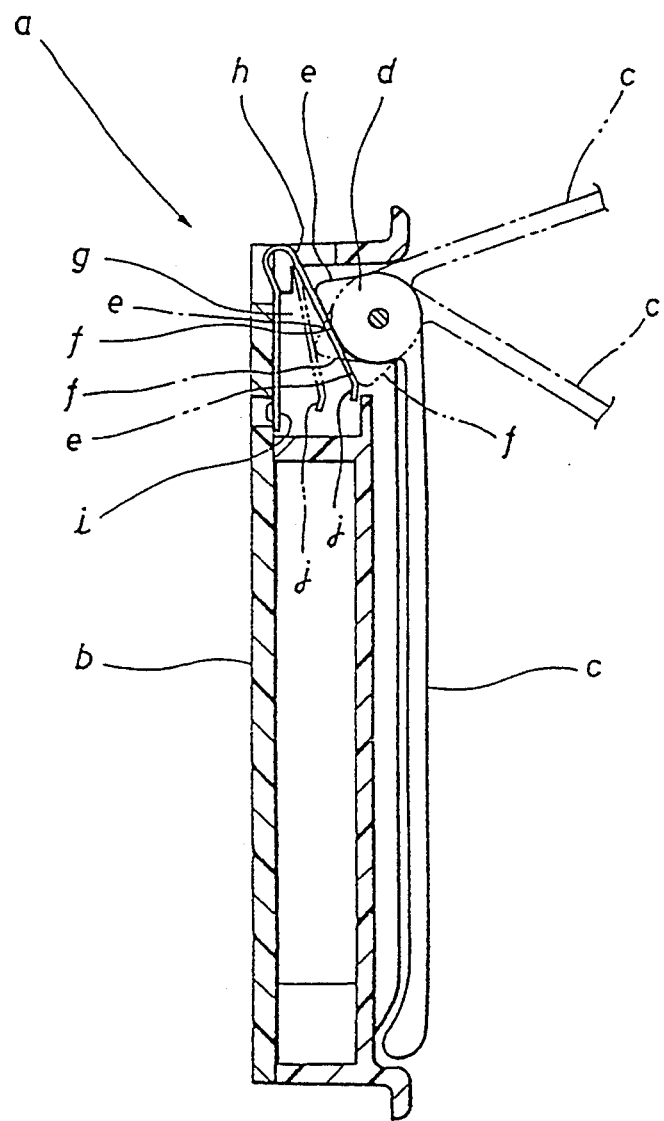
FIG. 9 is a sectional view of a conventional vanity mirror.

More specifically, the front cover 23 is pivotally rotatable about the pins 30 between the closed position shown in FIGS. 2 and 7 and the opened position shown in FIGS. 3 and 8. In the closed position, the front cover is over the mirror 17 and the lamp assembly 18. In the open position, the front cover 23 opens the front of the mirror 17 and the lens 20 of the lamp section 18.

Inside each one of the rectangular spaces 16 is installed a sliding piece 31 that is slidable up and down (in, for instance, FIGS. 6, 7 and 8). As best seen in FIG. 6, the sliding piece 31 is an angular cylinder and has a curved surface 32 at the top. In other words, as best seen in FIGS. 7 and 8, the top portion of the sliding piece 31 has a curved (or concave) surface 32. In particular, the front upper surface of the sliding piece 31 is formed into a slope that curves backward so that the top end merges with the back.

The sliding piece 31 has a hollow inner space 33 of a curved surface and also has two slits 34 (only one shown in FIG. 6) formed in the facing side walls (right and left walls in FIG. 6) of the sliding piece 31.

In addition, a coil spring 35 is also installed in each one of the rectangular spaces 16. Lengthwise, the coil spring 35 is longer than the rectangular space 16.

More specifically, as shown in detail in FIG. 7, the upper portion of the coil spring 35 is inserted from the bottom into the inner space 33 of the sliding piece 31 and the lower portion of the coil spring 35 is fitted over the holding pin 15. Thus, as seen in FIG. 6, the curved surface 32 of the sliding piece 31 is positioned so that it is near the cover mounts 11 and 13.

The holding pin 15 and the round inner surface of the sliding piece 31 aid the coil spring 35 to contract and extend straight.

As seen in FIG. 7, when the sliding piece 31 and the coil spring 35 are installed in the rectangular space 16 of the base casing 6, the mounting lug 25 which is in contact with the curved surface 32 of the sliding piece 31 causes the coil spring 35 to contract. In other words, the sliding piece 31 is pushed upwardly in FIG. 7 by the coil spring 35 and pressed against the slanted surface 28 of the mounting lug 25.

When the front cover 23 is closed as seen in FIG. 7, the second pressing point 29b of the round surface 29 of the mounting lug 25 is in contact with the sliding piece 31 above level of the pin 30 as shown in FIG. 7. Thus, the front cover 23 is kept closed. When the front cover is opened, as shown in FIG. 8, the first pressing point 29a of the round surface 29 of the mounting lug 25 is brought below the pin 30 level and kept in contact with the sliding piece 31. The front cover 23 is thus kept opened.

As seen from the above, the coil springs 35 and the sliding pieces 31 both installed in the rectangular spaces 16 of the base casing 6 maintain the front cover 23 in either an opened or a closed position via the mounting lugs 25.

More specifically, when the front cover 23 is in the closed position as shown in FIG. 7, the upper end of the curved surface 32 of the sliding piece 31 is pressed against the second pressing point 29b of the round surface 29 of the mounting lug 25 of the front cover 23 above the level of the rotational axis of the front cover 23, which is the pin 30. In other words, the coil spring 35 pushes the mounting lug 25 upward, and the front cover 23 is pressed rearward or clockwise in FIG. 7 about the pin 30. As a result, the front cover 23 is kept closed.

When the front cover 23 is going to be opened (by hand, for example), the front cover 23 is rotated counter-clockwise in FIG. 7 about the pin 30, overcoming the spring force of the coil spring 35. This rotational movement of the front cover 23 about the pin 30 forces the mounting lug 25 to push down the sliding piece 31 via its round surface 29. The round surface 29 of the mounting lug 25 moves on the curved surface 32 of the sliding piece 31 as the front cover 23 is rotated, thus pushing down the sliding piece 31 and compressing the coil spring 35. This results in an increase of the spring force of the coil spring 35 in the upward (in FIG. 7) direction.

At the moment when the first pressing point (or the opening point) 29a moves to the level of and slightly below the pin 30, the pressing direction of the sliding piece 31 against the mounting lug 25 via the coil spring 35 changes. It changes from the upward direction to a lateral direction (or to the right) in FIG. 7 by way of the curved surface 32 of the sliding piece 31. This point where the direction is changed under the maximum spring force of the coil spring 35 is a "click point". Due to the change of the pressing direction of the sliding piece 31, the first pressing point 29a of the mounting lug 25 is quickly brought further below the pin 30 level by the spring force of the coil spring 35. As a result, the front cover is opened as shown in FIG. 8.

When the front cover 23 is thus opened as seen in FIG. 8, the coil spring 35 presses the mounting lug 25 upward from the level below the pin 30. In other words, as shown in FIG. 8, the first pressing point 29a of the round surface 29 of the mounting lug 25 is in contact with the lower portion of the curved surface 32 of the sliding piece 31 and the coil spring 35 pushes the mounting lug 25 frontward below the level of the pin 30 or counter-clockwise about the pin 30. As a result, the front cover 23 is kept opened by the sliding piece 31 and the coil spring 35.

When the front cover 23 is going to be closed, the mounting lug 25, its round surface 29, the sliding piece 31 and the coil spring 35 make movements opposite to that described for the front cover 23 being opened.

As is clear from the description above, the vanity mirror of the present invention, that includes a mirror installed in the base casing and the front cover that opens and closes in front of the mirror, comprises: a front cover pivotally mounted to the base casing via a pair of mounting lugs formed in the back of the front cover, a pair of rectangular spaces provided at both ends of the base casing so as to house the mounting lugs of the front cover, a sliding piece and a coil spring installed in each one of the rectangular spaces so that the sliding piece is kept pushed by the coil spring in the direction of the depth (and not in the direction of the thickness) of the base casing, an opening (or first pressing) point and a closing (or second pressing) point formed on the circumference of each one of the mounting lugs that are in a press-contact with the concave surface of each sliding piece which is pressed against each one of the mounting lugs of the front cover by the coil spring.

Accordingly, in the vanity mirror of the present invention, a means that keeps the front cover opened and closed is made up by a combination of the coil spring and the sliding piece, which are long and slidable in the length wise direction, the vanity mirror does not need to be thicker more than it is necessary. In addition, one end of each of the sliding pieces are pressed against the mounting lug of the front cover and such an end of the sliding piece does not project over the mounting lug; accordingly, the thickness of the vanity mirror can be small. In addition, since the sliding piece does not project over the front cover, the vanity mirror can be thin and compact.

In the embodiment described above, the first and second pressing points of each one of the mounting lugs are pressed by the sliding pieces via the coil spring. However, it should not be limited to this, and the portions of the mounting lugs that contact with the sliding pieces can be surfaces that make a surface-contact with the sliding piece. In this case, the upper ends of the mounting lugs are formed so that they slope downwardly as they extend to the back and the back end faces are formed perpendicular to the upper end faces.

In addition, the vanity mirror of the above described embodiment uses the coil spring 35 and the sliding piece 31 installed at both ends of the base casing 6, but the present invention need not be limited to this, and only one pair of a coil spring and sliding piece can be used on one end of the base casing.

Furthermore, the specific shapes and structures shown in the above description is merely an example and does not limit the interpretation of the technological scope of this invention.

I claim:

1. A vanity mirror comprising a mirror which is installed in a base casing and a front cover which opens and closes in front of said mirror, said vanity mirror further comprising: mounting means formed on said front cover in the vicinity of an axial support that connects said front cover to said base casing; an axial support pin provided in said mounting means and said axial support for rotatably coupling together said front cover and said base casing; rectangular spaces which surround rear portions of said mounting means and are formed in said base casing; a movable sliding piece and a coil spring installed in each one of said spaces; pressing points formed on said mounting means, one of said pressing points being in contact with a pressing surface of said sliding piece when said front cover is opened and another of said pressing points being in contact with said pressing surface of said sliding piece when said front cover is closed; and said pressing surface of each Of said sliding piece installed in each one of said spaces pressing against said pressing points of said mounting means of said front cover via said coil springs; and wherein when the front cover is closed, the closed front cover and the coil spring installed in each one of said spaces are in a parallel positional relationship.

2. A vanity mirror according to claim 1, further comprising a rod-like holding pin provided in each one of said rectangular spaces, said rod-like holding pin for retaining said coil spring.

3. A vanity mirror according to claim 1, wherein said sliding piece has a hollow inner space into which one end of said spring means is inserted.

4. A vanity mirror comprising a base casing with a mirror installed therein and a front cover mounted to said base so as to open and close in front of said mirror, said vanity mirror further comprising:

a mounting lug formed on the back of said front cover, said mounting lug having a round circumferential surface and pivotally mounting said front cover to said base casing via a pin; and a sliding piece and a spring means installed in said base casing, said sliding piece having a curved surface at one end that is kept in contact via said spring means with said round circumferential surface of said mounting lug of said front cover;

wherein when said front cover is opened, said spring means keeps pressing said front cover via said mounting lug in one pivotal direction about said pin, thus retaining said front cover opened, and when said front cover is closed, said spring means keeps pressing said front cover via said mounting lug in another pivotal direction about said pin, thus retaining said front cover closed.

5. A vanity mirror according to claim 4, further comprising a rod-like holding pin, said rod-like holding pin for retaining said spring means.

6. A vanity mirror according to claim 4, wherein said sliding piece has a hollow inner space into which one end of said spring means is inserted.

* * * * *